United States Patent
Withers

(10) Patent No.: US 7,687,134 B2
(45) Date of Patent: Mar. 30, 2010

(54) TEAR RESISTANT FILM

(75) Inventor: Phillip Withers, Southbank (AU)

(73) Assignee: International Consolidated Business Pty Ltd., Melbourne, Victoria (AU)

( * ) Notice: Subject to any disclaimer, the term of this patent is extended or adjusted under 35 U.S.C. 154(b) by 0 days.

(21) Appl. No.: 11/720,060

(22) PCT Filed: Nov. 25, 2004

(86) PCT No.: PCT/AU2005/001785

§ 371 (c)(1),
(2), (4) Date: Nov. 26, 2007

(87) PCT Pub. No.: WO2006/056017

PCT Pub. Date: Jun. 1, 2006

(65) Prior Publication Data

US 2008/0138638 A1  Jun. 12, 2008

(30) Foreign Application Priority Data

Nov. 25, 2004  (AU) .............................. 2004906760

(51) Int. Cl.
B32B 3/00 (2006.01)
B32B 3/28 (2006.01)
B32B 3/30 (2006.01)
B65D 30/08 (2006.01)
B65D 30/02 (2006.01)

(52) U.S. Cl. ...................... 428/156; 428/167; 428/187; 383/109; 383/112; 383/118; 383/903

(58) Field of Classification Search ................. 428/156, 428/167, 187; 383/105, 109, 112, 118, 903
See application file for complete search history.

(56) References Cited

U.S. PATENT DOCUMENTS

| | | | | |
|---|---|---|---|---|
| 2,875,543 A | * | 3/1959 | Sylvester et al. | .............. 428/30 |
| 3,846,843 A | | 11/1974 | Franer | |
| 3,857,144 A | * | 12/1974 | Bustin | ........................ 156/209 |
| 5,618,111 A | | 4/1997 | Porchia et al. | |
| 6,394,651 B2 | | 5/2002 | Jackson | |
| 6,394,652 B2 | | 5/2002 | Meyer et al. | |
| 6,472,084 B1 | | 10/2002 | Middlesworth et al. | |
| 2003/0118759 A1 | * | 6/2003 | Yoshikawa et al. | ......... 428/35.2 |

FOREIGN PATENT DOCUMENTS

WO   WO 01/53096 A   7/2001

* cited by examiner

*Primary Examiner*—David R Sample
*Assistant Examiner*—Catherine Simone
(74) *Attorney, Agent, or Firm*—Knobbe Martens Olson & Bear LLP

(57) ABSTRACT

Tear resistant flexible polymeric film having at least one embossed zone, the at least one embossed zone comprising a plurality of adjacent embossed patterns (8) through the film material, each embossed pattern (8) comprising either at least one spiral embossed rib formation (12) having a plurality of turns spaced from each other by corresponding spiral less-embossed film material (20) or an array of concentric embossed rib formations (12) spaced from each other by corresponding concentric less-embossed film material (20), wherein the embossed rib formation or formations (12) are formed by stretching the film material thereof relative to said less-embossed film material (20). The film may be in the form of a bag, particularly a thin-walled disposable bag, in which the embossed patterns (8) increase the tear resistance of the bag. The embossed patterns may extend across the entire embossed zone.

15 Claims, 2 Drawing Sheets

TEAR RESISTANT FILM

TECHNICAL FIELD

The present invention relates to flexible polymeric film that is resistant to being torn, particularly to being punctured. In one use the film is in the form of a bag, such as a garbage bag, in which case the resistance to tearing or puncturing may be from the contents of the bag. In at least one embodiment, the film may also control the propagation of any tear that does develop. The invention is especially concerned with flexible polymeric film in which improved properties are provided by embossing the film.

BACKGROUND ART

Embossing of polymeric materials has been previously proposed to change the properties of the material. For example, in U.S. Pat. No. 6,394,651 and U.S. Pat. No. 6,394,652 it is proposed to provide embossed patterns in the material of flexible polymeric bags to enable the bags to stretch and better accommodate the bag contents. Each embossed pattern is in the form of parallel embossed ribs and is spaced from adjacent embossed patterns by unembossed regions. The arrangement permits stretch of the bag material in a selected direction.

An embossed film is also described in U.S. Pat. No. 6,472,084. In this disclosure the film is an elastic film suitable for use as a waistband and comprises a highly elastic core layer with polyolefin embossed surface layers. The embossing includes uniform unidirectional parallel marks in the machine direction. The film has activation zones and non-activation zones which are described as having sufficient elasticity and non-elasticity, respectively, to stretch to at least 200% while maintaining a permanent set percent of no more than 5% and tear strengths as measured by the Elmendorf Tear Test of 30 g and 50 g, respectively. A film with such a high degree of stretch would not be suitable for use in a bag such as a garbage bag.

The embossed films in the described prior proposals are designed to stretch and, in the case of the multi-layered elastic film of U.S. Pat. No. 6,472,084, to be tear resistant. There remains a need for a flexible polymeric film suitable for use as a disposable bag and having improved tear resistance.

It has been discovered that embossing flexible polymeric film aids in the reduction of tears or punctures developing when selected patterns of embossing are employed.

Thus, it is one aim of the present invention to provide a flexible polymeric film having embossing which alleviates the formation of tears or punctures.

BRIEF SUMMARY OF THE INVENTION

According to the present invention, there is provided flexible polymeric film having at least one embossed zone, the at least one embossed zone comprising a plurality of adjacent embossed patterns through the film material, each embossed pattern comprising either at least one spiral embossed rib formation having a plurality of turns spaced from each other by corresponding spiral less-embossed film material or an array of concentric embossed rib formations spaced from each other by corresponding concentric less-embossed film material, wherein the embossed rib formation or formations are formed by stretching the film material thereof relative to said less-embossed film material.

It has been found that the embossed patterns in accordance with the invention can provide a significant gain in Dart Impact tear strength compared to the unembossed same flexible polymeric film. The Dart Impact test is a measure of the ability of a flexible polymeric film to resist puncturing, so the improvement in Dart Impact tear strength has a substantial effect on tear reduction by resisting the initiation of punctures and tears.

It is believed the improved Dart Impact tear strength achieved by the embossed patterns in accordance with the invention results from the increased energy absorbing ability of the embossed zone or zones or the film. Without wishing to be bound by theory, it is believed that the embossed rib formations have increased tensile strength compared to the less-embossed and any unembossed film material, due to the stretching of the film material during embossing and the resultant thinning and molecular orientation of the embossed material. The embossed pattern consists of alternating strong, thinner rib formation material and the less-embossed thicker material between the rib formation(s). When a strain is encountered in the embossed zone, the thinner, stronger rib formations resist further lateral stretching, while the thicker, weaker less-embossed material yields more easily to the strain. A cushioning effect is therefore created to absorb the strain, thereby increasing puncture and tear resistance. The spiral/concentric rib formation embossed patterns assist this by ensuring that the film material of the embossed patterns is able to stretch in all directions in the plane of the film, preferably equally.

During the application of strain to the embossed patterns, there may be a degree of flattening of the rib formations which also assists in absorbing the strain. Preferably the cross-section of the embossed rib formations is peaked, that is effectively triangular, most preferably with equal inclined sides, but the cross-section may take other shapes (outlines), such as rounded or squared.

Preferably, the corresponding less-embossed film material between the turns of the at least one spiral embossed rib formation or between the array of concentric embossed rib formations is not stretched at all during the embossing procedure, and is therefore unembossed. However, stretching of the less-embossed film material by up to 30%, or possibly even up to 50%, of the stretching of the embossed rib formation or formations during embossing may not affect the tear or puncture resistance of the embossed zone excessively detrimentally. It will be appreciated that the film material of the rib formation(s) may not be stretched longitudinally during the embossing process, and any longitudinal stretching of the rib formation(s) during the application of strain to the embossed zone may assist in the tear or puncture resistance.

The preferred degree of stretch of the material of the rib formation(s), laterally of their length, to achieve the desired tear resistance, may be readily determined by experiment. However, it has been found that a permanent stretch during the embossing procedure in the range of about 50 to about 200%, including any range or figure within these limits, has been found to achieve advantageous results. More preferably the degree of stretch during embossing of the rib formations in the range of about 75 to about 150%. In one particular embodiment the degree of stretch is about 100%.

The embossed patterns in accordance with the invention may also control the propagation of any tear that does develop in the film by directing a tear along the corresponding spiral or concentric less-embossed film material, due to the increased force necessary to tear the molecularly-oriented material of the rib formation(s). In the case of a spiral embossed pattern, it may be advantageous for the end of the outermost turn of the or each spiral formation to be joined to the adjacent inner turn so that the outermost end of the corresponding spiral less-embossed film material is closed by the rib formation(s). Similarly, the innermost turn of the spiral rib formation or formations may be joined to the adjacent turn so as to form an enclosed region of less-embossed film material at the centre of the embossed pattern, similar to an innermost region of less-embossed film material in an array of concentric embossed rib formations.

Preferably, in the or each embossed zone, the plurality of embossed patterns are provided immediately adjacent to each other, so that the embossed patterns are continuous across the embossed zone, in order to provide consistent tear resistance improvement across the embossed zone. However, this may not be essential in all prospective uses of the flexible polymeric film and at least some of the embossed patterns may be spaced from one or more adjacent embossed patterns by up to 10 mm, preferably by no more than 5 mm. The closest packing of embossed patterns in an embossed zone may be achieved by forming the embossed rib formations as polygons having from 3 up to about 50 sides, that is any number of sides within the range, preferably from about 4 to about 20 sides and more preferably from about 5 to about 12 sides. In order to alleviate stress concentration at the joins of adjacent sides of the polygonal rib formations, there should be at least 5 sides in the preferred polygon. It is preferred that the sides of the polygonal rib formations are of substantially equal length, but this is not essential. In a spiral polygon, at least one side of each turn must be of slightly less length than others. In the most preferred embodiment the embossed patterns have the embossed rib formations or turns in concentric or spiral hexagons with sides of substantially equal length.

It is not essential for the embossed patterns to be polygonal. Instead, they could be, for example, circular or possibly even oval or a combination. Embossed patterns of different size may be provided in the embossed zone, particularly but not necessarily to increase the packing of the embossed patterns. Thus, for example, if the primary embossed patterns are circular and of one size, the gaps between them may be at least partially filled by one or more embossed patterns of different shape and/or different size.

Within each embossed pattern, the cross-sectional dimensions of each rib formation and the spacing between the rib formations or turns may vary depending upon a number of factors, including the use to which the film material will be put, the size of each embossed pattern, the type of material and the thickness of the material.

Typically, the average cross-sectional dimension of each embossed pattern is in the range from about 2 to about 500 mm, including any dimension or range within these limits, preferably from about 4 to about 150 mm, more preferably from about 5 to about 50 mm, and most preferably from about 6 to about 25 mm. In one particular embodiment, the cross-sectional dimension between opposed equal sides of a hexagonal embossed pattern is about 16 mm.

The thickness of the flexible polymeric film may range from about 3 µm upwards, for example to about 500 µm, including any range or thickness within these limits, but is preferably from about 6 µm to about 100 µm, more preferably from about 10 µm to about 50 µm, most preferably from about 15 µm to about 40 µm. In one particular embodiment, film for use in garbage bags has a thickness of about 21 µm.

The flexible polymeric film may be formed from any suitable material or combination of materials. These include polyethylene, for example high density polyethylene, low density polyethylene, linear low density polyethylene or the like and including Metallocene-catalysed polyethylene, polypropylene including Metallocene-catalysed polypropylene, polyvinyl chloride, polyvinylidene chloride, and polyesters. The film may be a single layer material or a laminate or co-extrusion of two or more layers. All such films and film materials are well known. For disposable films, such as in the form of garbage bags, the film material should be as cheap as possible and is preferably formed of a single layer of linear low density polyethylene or high density polyethylene, most preferably Metallocene-catalysed. The film may also include fillers and other non-polymeric material.

The width of each embossed rib formation is typically in the range of from about 0.01 to about 10 mm, including any figure or range within these limits, but is preferably from about 0.05 to about 1 mm and more preferably from about 0.1 to 0.5 mm. In a particular embodiment, the rib width is about 0.3 mm.

The height of the embossed rib formations may range from about 0.02 mm upwards, for example to about 10 mm, including any figure or range within these limits, but is preferably from about 0.1 to about 1 mm, more preferably from about 0.2 to about 0.5 mm. In one particular embodiment, the height of the rib formations is about 250 µm. The height is measured from the plane of the unembossed material.

The spacing between adjacent embossed rib formations or adjacent turns of the one or more spiral rib formation of any one embossed pattern, that is the width of the corresponding less-embossed film material between the rib formations or turns, is typically in the figure or range of about 0.01 to about 10 mm, including any figure or range within these limits, but is preferably from about 0.1 to about 2 mm, and more preferably from about 0.3 to about 1 mm. In a particular embodiment the spacing of the embossed rib formations or turns in any one embossed pattern is about 0.7 mm.

Preferably each concentric embossed rib formation is continuous throughout its length to form a closed loop or each spiral embossed rib formation is continuous from the outer periphery of the respective embossed pattern to the centre of the embossed pattern. However, it will be appreciated that any one embossed rib formation may be discontinuous while still providing the tear resistant advantages in accordance with the invention. The components of such a discontinuous embossed rib formation may be spaced longitudinally from each other by no more than about 10 mm, preferably no more than about 5 mm, more preferably by no more than about 2 mm and most preferably by no more than about 0.7 mm. The lengths of such individual components of a discontinuous rib formation are not believed to be important provided the desired tear resistance is provided. Preferably each embossed rib formation component is at least about 5 mm along.

It will be appreciated that in a spiral embossed rib formation, a turn is equivalent to a rib formation extent of 360° or to 360° if a discontinuous rib formation were assumed to be continuous through the extent. A spiral embossed rib formation (whether continuous or discontinuous) may extend through an incomplete number of full turns (for example 7.5 turns).

Preferably, all of the dimensions and spacing of the embossed rib formations or turns in each embossed pattern are the same in order to provide consistent tear resistance in the embossed pattern. However, it may under some circumstances be desirable for the dimensions and/or spacing to vary. In one such embodiment, the outermost embossed rib formation or turn of the embossed patterns is enlarged compared to the other concentric embossed rib formations or turns in order to provide enhanced resistance to propagation of a tear that has developed in one embossed pattern into an adjacent embossed pattern.

Preferably, a single embossed zone extends throughout the length and width of the flexible polymeric film. This will facilitate manufacture, since there is no need to selectively interrupt the embossed zone, and ensures that the enhanced tear resistance is provided throughout the film. However, the enhanced tear resistance may be required only in one or more selected portions of the flexible polymeric film, in which case the embossed zone or zones need only extend there.

The embossing of the embossed patterns is through the thickness of the flexible polymeric film. Thus, the embossed rib formation or formations in any one embossed pattern on one surface of the film corresponds to a valley on the other surface of the film. All of the embossed rib formations may be on one surface of the film, or both surfaces of the film may have embossed rib formations, depending upon how the embossed patterns are formed. If embossed rib formations are provided on both surfaces of the flexible polymeric film, the opposed rib formations must clearly be offset from each other. For example, alternating rib formations in one embossed pattern may be on opposed film surfaces or the embossed rib formation(s) in any one embossed pattern may be on one surface of the film but on the opposite surface to the embossed rib formation(s) of one or more adjacent embossed patterns.

Two or more flexible polymeric films may be embossed with the plurality of adjacent embossed patterns at the same time by providing the films side by side in the embossing apparatus and/or by superposing the films. The latter arrangement is particularly advantageous where the flexible polymeric film is in the form of a bag, a preform of a bag (in the sense that two layers of the film are provided but the bag is not fully formed), or a web of connected bags or bag preforms. Such bags may be, for example, garbage bags, receptacle liners, inner bags, garden bags, storage bags or any similar disposable or other bags.

As a result of being embossed at the same time, two superposed layers of the flexible polymeric film will have embossed rib formations on one of the layers that interfit with corresponding valleys defining the embossed rib formations on the other layer. In the case of a bag, in a lay-flat condition the bag has a front wall of the film material and a back wall of the film material and wherein the embossed rib formations on one of the front and back walls interfit with corresponding valleys defining the embossed rib formations on the other of the front and back walls.

The embossing may be performed by any known means, such as an embossing roller or rollers for continuous or semi-continuous production or an embossing plate or plates in a static or dynamic press for interrupted or semi-continuous production. Alternatively, vacuum and/or thermoforming may be used. Where the embossed rib formations are formed on only one surface of the flexible polymeric film or films, the embossing pattern may be provided on only one roller or plate pressing onto a plain counter roller or plate, preferably a rubber, polyurethane or other rubber-like coated counter roller or plate.

Substantial embossing pressure may need to be applied by the embossing apparatus to provide the desired embossed patterns, for example, in the case of a roller arrangement, up to 100 kg per cm width of the film material being embossed. Particular applied roller pressures have been in the range 60 to 80 kgs per cm width of the film or films. Thus, given that film widths may be up to 80 or even 100 cm, the force applied by the embossing rollers may be about 6.4 tonnes or more.

Where two or more superposed films thicknesses are embossed together, such forces may have the undesired effect of causing the films to stick together. Problems of this type can be dealt with in advance by, for example, appropriate temperature control of the films and/or rollers and by other physical and/or chemical treatment of the film including the addition of anti-block agents to the film.

BRIEF DESCRIPTION OF THE DRAWINGS

One embodiment of the flexible polymeric film in accordance with the present invention will now be described by way of example only with reference to the accompanying drawings in which.

DETAILED DESCRIPTION OF THE INVENTION

For convenience, the film of the invention will be further described with reference to its use as a bag. Before the film can be embossed and formed into a plastic bag, the film first has to be formed.

Manufacture of the film typically begins with a continuous extruded tube of polymer such as LLDPE or HDPE through a blown film die or with cast film of the same material. In the case of blown film, the film is converted into a lay flat condition by suitable guide rollers. Alternatively film may be extruded as a sheet.

Referring for convenience to blown film, once the film has been produced and cooled, the double film thicknesses are passed through an embossing station provided with an embossing roller having a suitable plurality of repeating embossing patterns located over the surface of the roller. The embossing will generally be formed by a pressure of up to 100 kg per cm of film width applied between the embossing roller and a polyurethane-coated counter roller. Alternatively, or in addition, a vacuum may be applied to the films, with or without heat. The embossed two layers of film can then be formed into individual interconnected bags by a suitable heat sealing arrangement such as a heated knife, heated head or clamp or the like. Alternatively, the interconnected bags may be formed prior to the embossing procedure.

Figure 1:
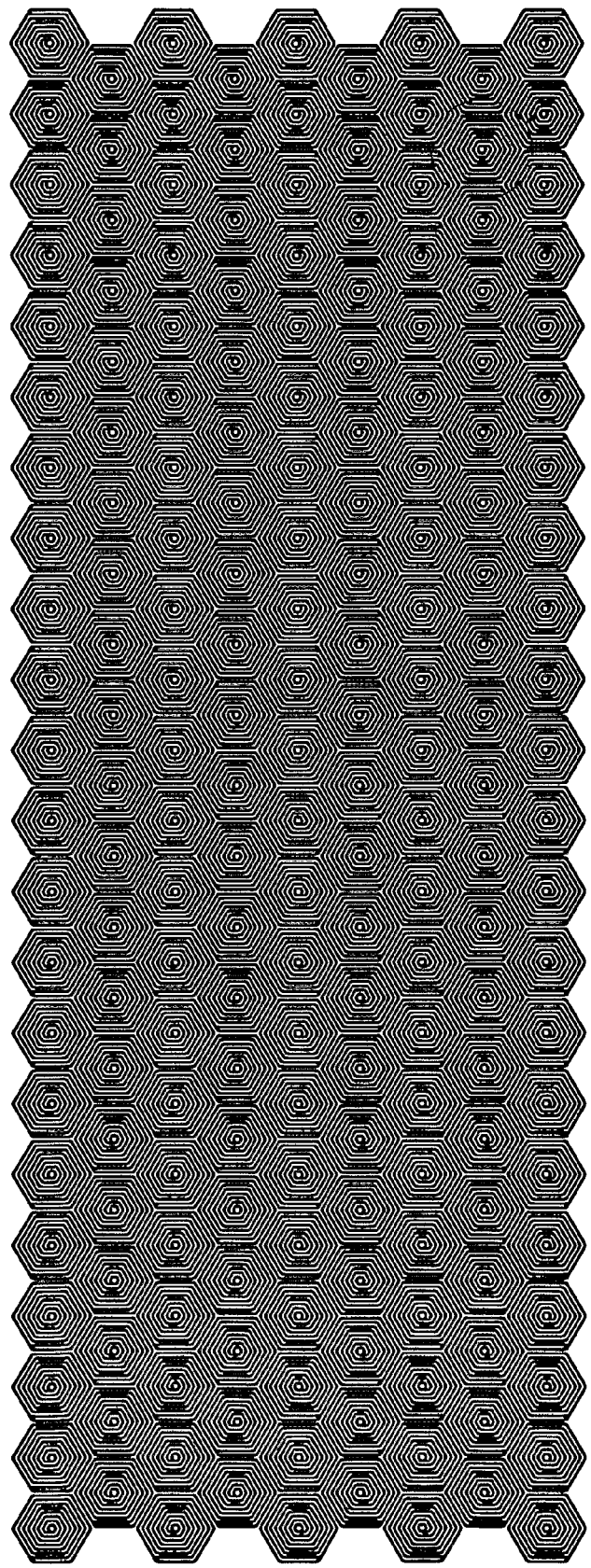
FIG. 1 is a plan view of a portion of the film showing a typical pattern of embossing applied to the film.

In FIG. 1 there is shown one typical pattern of embossed ribs. This pattern extends over the entire or almost the entire surface of the plastic bag including the front, rear and any side surfaces. It is to be noted that there may be areas on the surfaces which do not have any embossing such as, for example, borders or areas around the edges of the surfaces or the like. The pattern is formed through two superposed layers of the film in a lay flat condition of the blown film.

Figure 2:
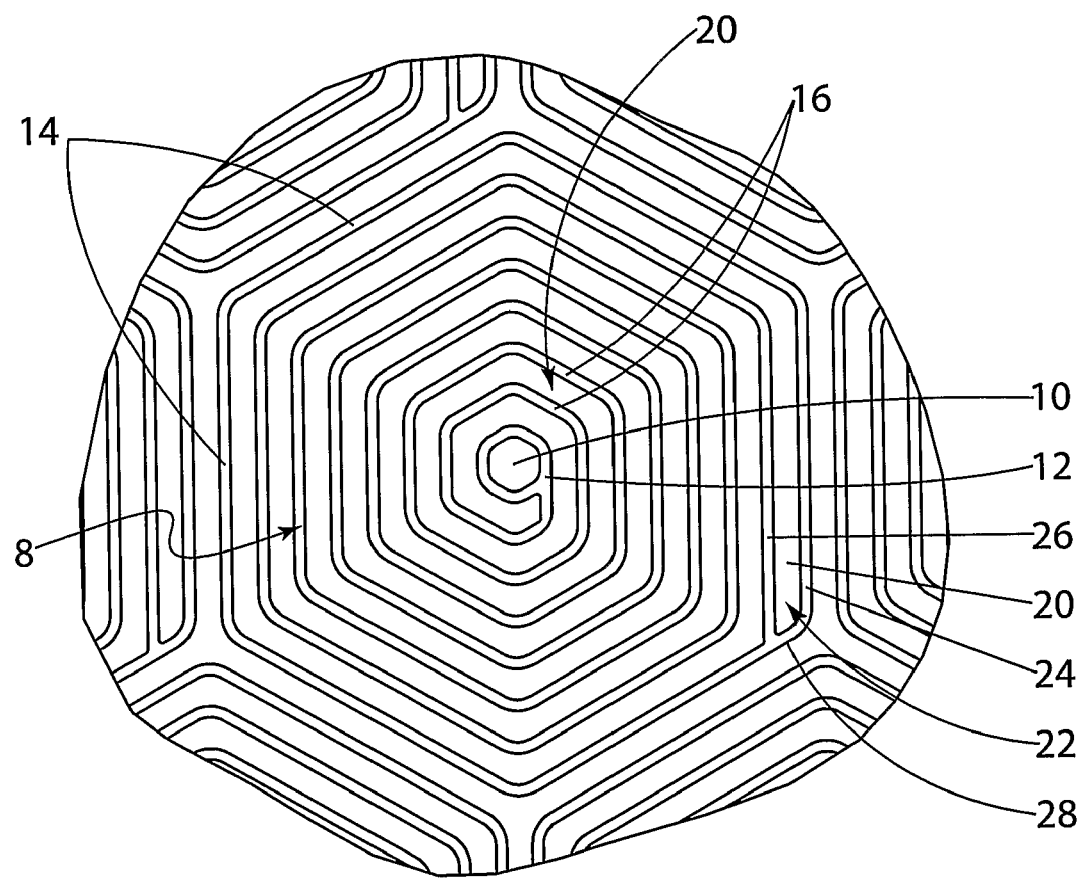
FIG. 2 is a more detailed close-up plan view of one regularly repeating embossed pattern on the film of FIG. 1.

With reference to FIG. 2, which is a close-up view of one repeating embossed pattern of the overall embossing, it can be seen that the embossed pattern, generally denoted as 8, has a central section 10 defined by a closed loop formed from a rib 12 arranged in a generally circular or hexagonal arrangement with one end of the rib joined to an adjacent turn of the rib. The rib 12 extends from the central portion 10 in a generally hexagonal spiral having sides 16 to an outer hexagonal wall 14 formed by the outer extent of the rib. The hexagonal spiral has about 6 turns around central part 10. In a particular embodiment for a garbage bag formed of linear low density polyethylene monolayer film having a thickness of 21 μm, the embossed pattern has a cross-sectional dimension of 16 mm and the embossed rib 12 has a height of 0.25 mm and a width of 0.3 mm throughout its length.

A corresponding space 20 is defined between two adjacent turns of the rib 12. The space 20 between adjacent turns forms a substantially unembossed section of the film material. In the embodiment, the space 20 has a width of 0.7 mm along its length.

The outer end 22 of the space 20 is formed by the last two turns 24 and 26 of the spiral merging at 28. The stop or termination 28 of the space 20 formed by the joining of turns 24 and 26 may alleviate any tear in the material of the pattern 8 from propagating beyond the limits of the hexagonal pattern 8.

EXAMPLES

A single layer of embossed film as described above with reference to the drawings was subjected to a Dart Impact Tear Test in accordance with ASTM D1709. The resultant figure of 300 g to puncture the embossed film was exactly twice the figure (150 g) for identical unembossed film tested in the same way, and reflects a substantial improvement in tear resistance of 100% by embossing the film as described.

In subsequent tests using identical test procedures, the following results were achieved for different film materials either having the same embossed patterns as described above with reference to the drawings or unembossed:

TABLE I

| Sample | Film Material | Film Thickness | Dart Impact Result |
|---|---|---|---|
| 1. | Black LLDPE/Metallocene Unembossed | 21 μm | 325 g |
| 2. | Black LLDPE/Metallocene Embossed | 21 μm | 400 g |
| 3. | White HDPE blend Unembossed | 13 μm | 125 g |
| 4. | White HDPE blend Embossed | 13 μm | 150 g |

Subjective machine direction tear force tests were also performed on 13 μm HDPE film that was locally stretched, but not punctured, by a rounded 6 mm probe. The force required to tear the stretched material (thinned and locally oriented) was 50 g, while that required to teat the unstretched material was 20 g. If the stretched material is considered to represent the embossed rib formations of the embossed patterns in accordance with the invention and the unstretched material is considered to represent the less-embossed (unembossed) film material between the embossed rib formations, it may be seen that the stretched material will provide a greater resistance to tearing and that any tear in the embossed pattern may therefore be directed along the less-embossed material between the embossed rib formations.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge.

The invention claimed is:

1. Flexible polymeric film having at least one embossed zone, the at least one embossed zone comprising a plurality of adjacent embossed patterns through a thickness of the film material, each embossed pattern comprising either at least one spiral embossed rib formation having a plurality of turns spaced from each other by corresponding spiral less-embossed film material or an array of concentric embossed rib formations spaced from each other by corresponding concentric less-embossed film material, wherein the film material of the embossed rib formation or formations is configured to be stretched through its thickness relative to said less-embossed film material, wherein said embossed pattern is configured such that the impact tear strength is increased when stretched compared to the less-embossed film material.

2. Flexible polymeric film according to claim 1, wherein the corresponding spiral or concentric less-embossed film material is unembossed.

3. Flexible polymeric film according to claim 1, wherein the degree of stretch of the embossed rib formations is in the range of 50 to 200% of the unembossed film material.

4. Flexible polymeric film according to claim 1, wherein all of the embossed rib formations are on one surface of the film.

5. Flexible polymeric film according to claim 1, wherein the plurality of embossed patterns in the embossed zone are immediately adjacent to each other.

6. Flexible polymeric film according to claim 1, wherein the embossed patterns are polygonal.

7. Flexible polymeric film according to claim 6, wherein the embossed patterns are hexagonal.

8. Flexible polymeric film according to claim 1, wherein the embossed patterns in the embossed zone are the same size.

9. Flexible polymeric film according to claim 1, wherein the embossed zone extends over the entire film.

10. Flexible polymeric film according to claim 1, wherein the film comprises one or more of polyethylene, polypropylene, polyvinyl chloride, polyvinylidene chloride and polyester in one or more layers.

11. Flexible polymeric film according to claim 10, wherein the film material comprises polyethylene selected from one or more of high density polyethylene, low density polyethylene, linear low density polyethylene, and Metallocene-catalysed polyethylene.

12. Flexible polymeric film according to claim 1, which is a monolayer film.

13. Flexible polymeric film according to claim 1, which is in the form of a bag.

14. Flexible polymeric film according to claim 13, wherein in a lay-flat condition the bag has a front wall of the film material and a back wall of the film material and wherein the embossed rib formations on one of the front and back walls interfit with corresponding valleys defining the embossed rib formations on the other of the front and back walls.

15. Flexible polymeric film according to claim 1, which is in two superposed layers that have been embossed at the same time.

* * * * *

UNITED STATES PATENT AND TRADEMARK OFFICE
CERTIFICATE OF CORRECTION

| | | |
|---|---|---|
| PATENT NO. | : 7,687,134 B2 | Page 1 of 1 |
| APPLICATION NO. | : 11/720060 | |
| DATED | : March 30, 2010 | |
| INVENTOR(S) | : Phillip Withers | |

It is certified that error appears in the above-identified patent and that said Letters Patent is hereby corrected as shown below:

On the Title Page, Item (22), change "2004" to --2005--.

Signed and Sealed this

Fourteenth Day of September, 2010

David J. Kappos
*Director of the United States Patent and Trademark Office*